UNITED STATES PATENT OFFICE.

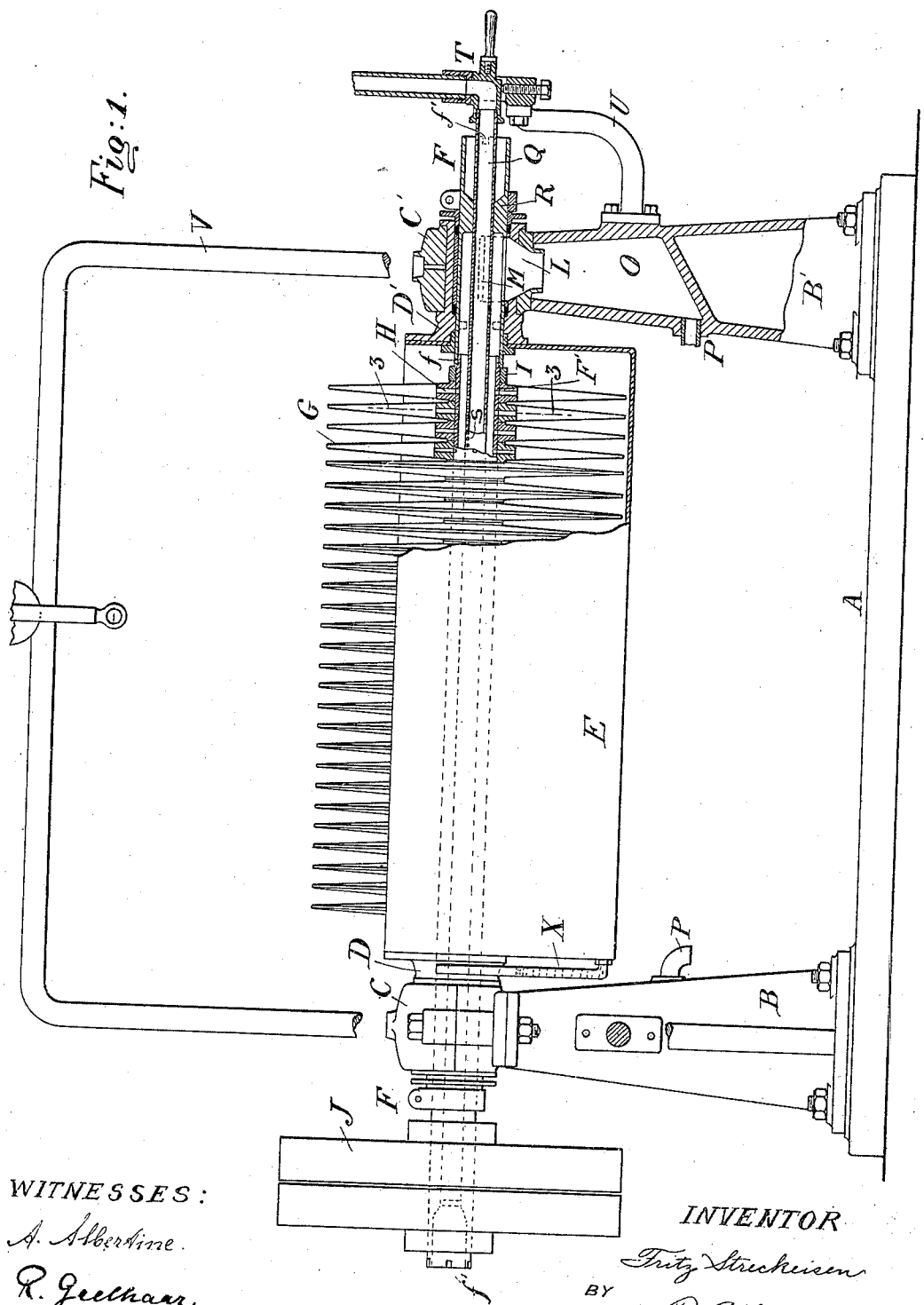

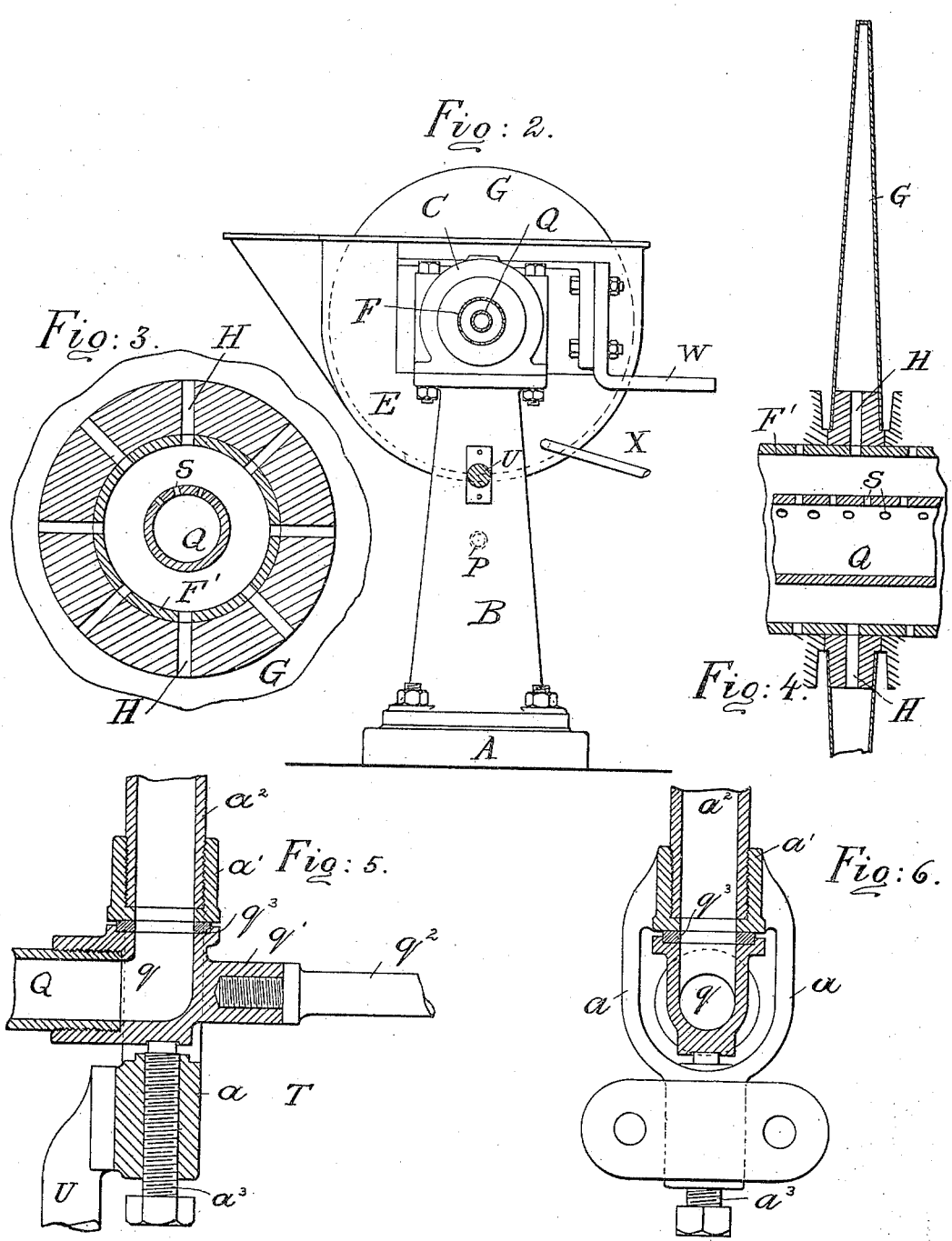

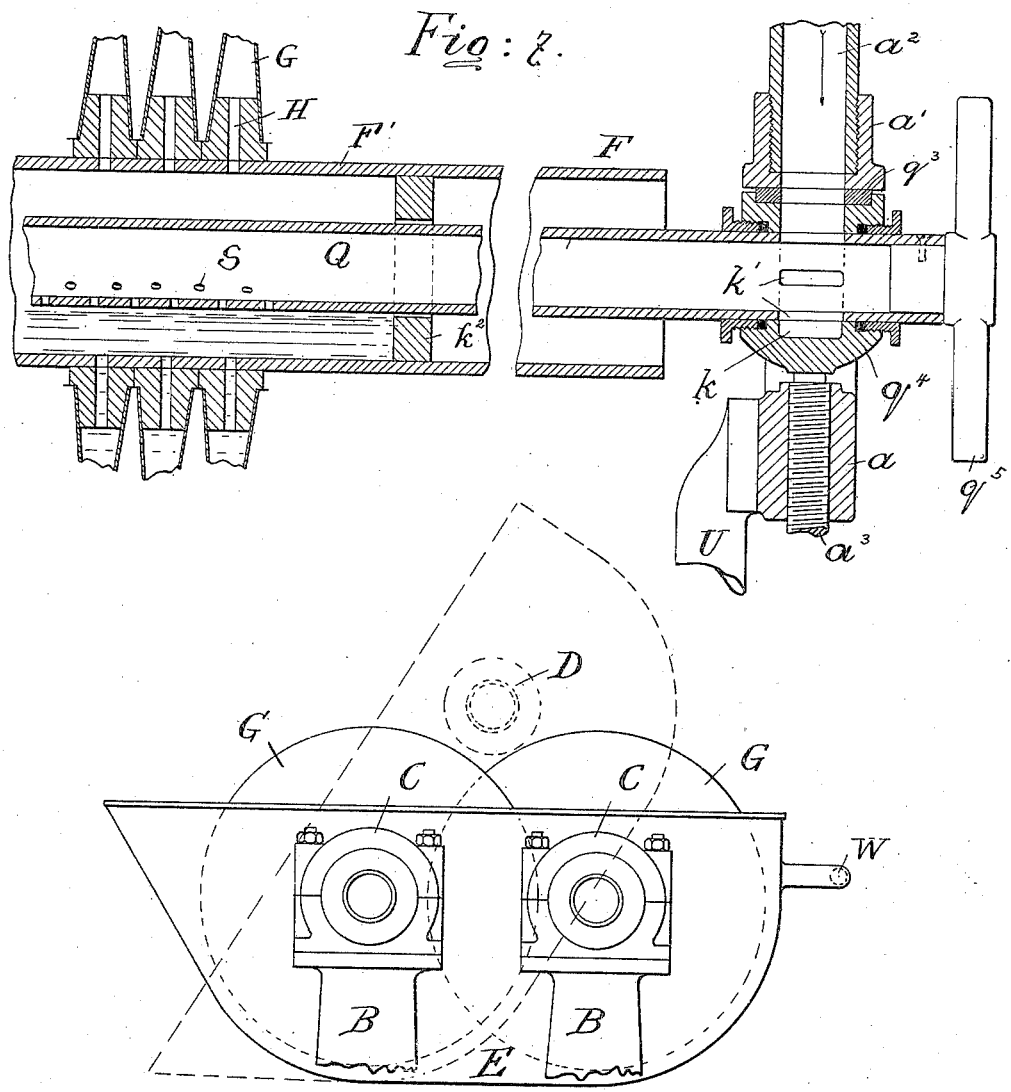

FRITZ STRECKEISEN, OF UTZENDORF, SWITZERLAND.

EVAPORATING APPARATUS.

SPECIFICATION forming part of Letters Patent No. 684,651, dated October 15, 1901.

Application filed January 10, 1901. Serial No. 42,803. (No model.)

*To all whom it may concern:*

Be it known that I, FRITZ STRECKEISEN, a citizen of Switzerland, residing at Utzendorf, in the canton of Bern, Switzerland, have invented a new and useful Evaporating Apparatus, of which the following is a specification.

My invention relates to improvements in apparatus for heating and condensing fluids by means of a revolving radiator; and the object of my invention is to provide an apparatus in which milk or any other fluid may be condensed or thickened without attaining a taste or odor peculiar to boiled milk or fluid and in which said fluid will not reach too high a temperature to allow it to burn.

A further object is to provide an apparatus that can be regulated to suit and which can readily be taken apart for cleaning.

I attain these objects by the mechanism shown in the accompanying drawings, in which—

Figure 1 is a front view of the entire apparatus, parts being shown in section. Fig. 2 is an end view of the same. Fig. 3 is an enlarged section of a part of the apparatus on the line 3 3 of Fig. 1; Fig. 4, a longitudinal section of the same part. Fig. 5 is a detail sectional view of steam-inlet; Fig. 6, an end view of the same part, being shown in section. Figs. 7 and 8 are modifications.

Similar letters refer to similar parts throughout the several views.

Referring to Figs. 1, 2, 3, and 4, A is a base on which are mounted the two hollow standards B B', containing the bearings C C'. The hollow trunnions D D', attached to the vessel E, have fitted in them the hollow shaft F F'. The part F', which is screwed to the parts F of the shaft, is provided with disks containing holes H, corresponding to holes in the shaft. The disks G, being of a good fit, are held together by two nuts I, one of which is not seen. A tight and loose pulley J is mounted on the hollow shaft F. Semi-annular chambers of the bearings C and C', having a downward opening L, coincide with slots M of the hollow shaft F. The steam-inlet pipe Q, which is held in position by the bearings R, has on its upper side perforations S. In order to be able to quickly remove and again attach this pipe, a coupling T is provided, which is mounted on the rod U, extending from the standard. A frame V, containing a block or any other hoisting means, is provided for the ready removal of parts of the apparatus. The handle W serves for tilting the vessel for emptying the fluid. The gage X shows the level of the fluid in the vessel and can be turned downward for taking out part or whole of said fluid without tilting the vessel, as shown in Fig. 2. The steam-coupling T (see Fig. 5) consists of the fork $a$, which is screwed to the rod U, having at its top a collar or bushing $a'$, into which the steam-pipe $a^2$ is screwed. The steam-inlet pipe Q is connected to an elbow $q$, which latter has a projection $q'$ and a handle $q^2$. The upper flange of the elbow is provided with a packing-ring $q^3$. A set-screw $a^3$ holds the elbow $q$ against the collar $a'$, thereby compressing the packing-ring and making a tight fit.

Referring to Fig. 7, the coupling T is changed to allow the steam-inlet pipe Q to pass through the same. A handle $q^5$ is attached to said pipe Q, by which it may be turned. The elbow $q$ is here replaced by a stuffing-box $q^4$ with the annular chamber $k$, and the pipe Q is provided with the inlet-slots $k'$. Near the end of the hollow shaft F' a ring $k^2$ is fitted in said shaft, leaving a space between the ring and the steam-inlet pipe sufficiently large to allow the condensed water to flow through, but at a higher level than if the ring were not inserted.

Referring to Fig. 8, the letters stand for the same parts as in Fig. 1.

The operation is as follows: Milk or any other fluid that is to be condensed is placed in the vessel E to about the middle of the shaft, whereupon steam is allowed to enter into the inlet-pipe Q and through the perforations S. This steam, which is at about three atmospheres pressure, will enter the hollow lens-shaped disk G through the holes H and after coming in contact with the surface of the disk will condense, and gradually the disks will be so filled with condensed water until it overflows and passes through the opening H and M into the chamber O of the standard and then through the pipe P into the open air. The machine is now set in motion by the pulley J. The quick rotation of the disks will cause the entire inner surface of the same to be covered with a thin film of water. The steam now entering will heat this water, which again will heat the disk and fluid outside of the same contained in the vessel E. Should the steam directly heat the disks, the temperature of the latter would reach a point at which a burning or crusting of the fluid would take place.

It is obvious that an apparatus of this kind must be easily taken apart and again put together in a manner which will satisfy the working of the same. The construction of my apparatus in this regard is as follows: By releasing the set-screw $a^3$ the coupling T is loosened and the inlet-pipe may be drawn entirely out. The ends F of the hollow shaft are unscrewed at $f$ and withdrawn. A suitable wrench which fits the notches $f'$ is provided for this purpose. The inner part $F'$ of the hollow shaft containing the disks can now be removed by means of the block or other means, and by unscrewing the nuts I the disks may each be removed from the shaft. By reversing the operation the apparatus may again be put together readily. The time required for condensing liquids varies according to the degree of density required. After the required density has been reached the vessel is either tilted by means of the handle W or the gage is turned downward to allow the fluid to run out.

The apparatus shown in Figs. 1 and 2 cannot be regulated to suit all circumstances, and I therefore show such changes in Fig. 7 which will permit a regulation of the heating power as required. The inserted ring $k^2$ will allow the condensed water to rise, and since the inlet-pipe Q can be turned by the handle $q^5$ so that the perforations S face downward, or partly so, the steam will strike the water and condense instead of passing through the openings H. According to the position of the perforations S to the surface of the water more or less steam may be rendered inactive. The hot water will directly flow into the chamber O and flow out of pipe P.

As is shown in Fig. 8, my apparatus may be doubled or trebled, &c. The tilting is then done by removing the top half of one of the bearings C, so that the apparatus can be turned around the other trunnion, as shown by dotted lines.

I wish to state that I have received Letters Patent for a similar apparatus in Germany, No. 111,948, and in Switzerland, No. 17,881, but that the apparatus therein described differs from the one described in this application in the general construction, and especially in that the inlet-pipe is placed directly against the hollow shaft—i. e., eccentrically therein—and that the apparatus is not in working condition until it is completed in the manner as described in this application.

Having thus described my invention, I claim as new and desire to secure by Letters Patent—

1. In an evaporating apparatus, the combination of a series of hollow lens-shaped disks contained in a vessel mounted pivotally in the bearings of hollow standards, with a hollow perforated shaft, a steam-inlet pipe extending centrally into said shaft and containing perforations on the upper side, a steam-coupling, and means for rotating said hollow shaft and disks, substantially as described.

2. In an evaporating apparatus, the combination of a series of hollow lens-shaped disks contained in a vessel which latter is mounted pivotally in hollow standards, with a hollow perforated shaft composed of three parts, the middle one of which has mounted on it said disks, and contains perforations, while the outer ones have slots corresponding to annular chambers in said standards, a steam-inlet pipe containing perforations on but one side, a coupling on said inlet-pipe and means for rotating said shaft substantially as described.

3. In an evaporating apparatus the combination of a series of hollow disks contained in a vessel mounted pivotally in the bearings of hollow standards, with a hollow shaft composed of three parts the middle one of which is perforated and has mounted on it said disks, a steam-inlet pipe perforated on but one side, and means for lifting said middle part of shaft with disks from said vessel substantially as described.

4. In an evaporating apparatus the combination of standards with a vessel mounted pivotally in said standards, a hollow perforated shaft having hollow disks mounted thereon, a steam-inlet pipe, and a gage-tube capable of being turned downward and used as an outlet for the fluid substantially as described.

5. In an evaporating apparatus the combination of standards with a vessel mounted thereon, a hollow perforated shaft, disks mounted thereon and an inlet-pipe, said inlet-pipe having on one end a steam-coupling composed of an elbow, a fork, a bushing, a packing-ring and a set-screw, which latter presses said elbow against said bushing, substantially as described.

6. In an evaporating apparatus, the combination of standards with a vessel mounted thereon, a hollow perforated shaft, disks mounted on said shaft, a ring or collar in said shaft, a steam-inlet pipe and means for rotating said inlet-pipe for the purpose described.

FRITZ STRECKEISEN.

Witnesses:
LOUIS FISCHER,
LEIS HANKENTHAL.